United States Patent
Zhang et al.

(10) Patent No.: US 12,444,906 B2
(45) Date of Patent: Oct. 14, 2025

(54) HETEROGENEOUSLY INTEGRATED PHOTONIC PLATFORM WITH IMPROVED THERMAL PERFORMANCE

(71) Applicants: Chong Zhang, Santa Barbara, CA (US); Minh Tran, Goleta, CA (US); Tin Komljenovic, Goleta, CA (US)

(72) Inventors: Chong Zhang, Santa Barbara, CA (US); Minh Tran, Goleta, CA (US); Tin Komljenovic, Goleta, CA (US)

(*) Notice: Subject to any disclaimer, the term of this patent is extended or adjusted under 35 U.S.C. 154(b) by 685 days.

(21) Appl. No.: 17/851,688

(22) Filed: Jun. 28, 2022

(65) Prior Publication Data
US 2023/0420916 A1    Dec. 28, 2023

(51) Int. Cl.
| | |
|---|---|
| *H01S 5/00* | (2006.01) |
| *H01S 5/02* | (2006.01) |
| *H01S 5/024* | (2006.01) |
| *H01S 5/026* | (2006.01) |
| *H01S 5/10* | (2021.01) |

(52) U.S. Cl.
CPC .......... *H01S 5/1014* (2013.01); *H01S 5/0213* (2013.01); *H01S 5/02476* (2013.01); *H01S 5/026* (2013.01)

(58) Field of Classification Search
CPC .. H01S 5/1014; H01S 5/0213; H01S 5/02476; H01S 5/026; H01S 2301/176; H01S 5/02469; H01S 5/04254; H01S 5/04257; H01S 5/1032
See application file for complete search history.

(56) References Cited

U.S. PATENT DOCUMENTS

| | | | | |
|---|---|---|---|---|
| 11,971,577 | B2* | 4/2024 | Tran | H01S 5/1014 |
| 2002/0110328 | A1* | 8/2002 | Bischel | G02B 6/4201 |
| | | | | 385/27 |
| 2014/0029894 | A1* | 1/2014 | Bowen | G02B 6/34 |
| | | | | 385/37 |
| 2016/0131842 | A1* | 5/2016 | Mahgerefteh | G02B 6/136 |
| | | | | 385/11 |
| 2017/0003450 | A1* | 1/2017 | Rickman | G02B 6/30 |
| 2019/0170941 | A1* | 6/2019 | Mahgerefteh | G02B 6/12004 |
| 2019/0310423 | A1* | 10/2019 | Lee | G02B 6/305 |
| 2020/0233149 | A1* | 7/2020 | Park | G02B 6/13 |
| 2020/0257054 | A1* | 8/2020 | Venkatesan | G02B 6/305 |

(Continued)

*Primary Examiner* — Kinam Park
(74) *Attorney, Agent, or Firm* — Shalini Venkatesh (57) ABSTRACT

A device includes a first element having a passive waveguide structure supporting a first optical mode, a second element providing heat spreading functionality, a third element thermally coupled to the second element, having an active waveguide structure supporting a second optical mode, and a fourth element, at least partly butt-coupled to the third element, having an intermediate waveguide structure supporting intermediate optical modes. A tapered waveguide structure in either one of the first and fourth elements facilitates efficient adiabatic transformation between the first optical mode and one of the intermediate optical modes. No adiabatic transformation occurs between any of the intermediate optical modes and the second optical mode. Mutual alignments of the first, second, third and fourth elements are defined using lithographic alignment marks that facilitate precise alignment between layers formed during processing steps of fabricating the first, second, third and fourth elements.

19 Claims, 8 Drawing Sheets

(56) References Cited

U.S. PATENT DOCUMENTS

| | | | | |
|---|---|---|---|---|
| 2021/0215897 A1* | 7/2021 | Epitaux | ................ | G02B 6/4274 |
| 2021/0373235 A1* | 12/2021 | Zhang | .................. | G02B 6/1228 |
| 2022/0200228 A1* | 6/2022 | Tran | ...................... | H01S 5/4068 |

* cited by examiner

HETEROGENEOUSLY INTEGRATED PHOTONIC PLATFORM WITH IMPROVED THERMAL PERFORMANCE

FIELD OF THE INVENTION

The present invention relates to semiconductor lasers. More specifically, certain embodiments of the invention relate to improved performance of heterogeneously integrated lasers using dissimilar materials and thermal optimization.

BACKGROUND OF THE INVENTION

A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves. The material platform most commercially utilized for photonic integrated circuits is indium phosphide (InP), which allows for the integration of various optically active and passive functions on the same chip. Although many current PICs are realized in InP platforms, there has been significant research in the past decade in using silicon rather than InP for the realization of PICs, due to some superior characteristics as well as superior processing capabilities for the former material, that leverage the investment already made for electronic integrated circuits.

The biggest drawback in using silicon for PICs is that it is an indirect bandgap material which makes it hard to provide electrically pumped sources. This problem is generally solved by assembling PICs comprising two or more chips made from dissimilar materials in separate processes. Such an approach is challenging due to a need for very fine alignment, which increases packaging costs and introduces scaling limitations. Another approach to solving the indirect bandgap problem is to bond two dissimilar materials and process them together, removing the need for precise alignment during the bonding of larger pieces or complete wafers of the dissimilar materials, and allowing for mass fabrication. In this disclosure, we use the term "hybrid" to describe the first approach that includes precise assembly of separately processed parts, and we use the term "heterogeneous" to describe the latter approach of bonding two materials and then processing the bonded result to define the waveguides and other components of interest.

To transfer the optical signal between dissimilar materials, the initial heterogeneous approaches utilized tapers whose dimensions are gradually reduced until the effective mode refractive indices of two or more materials match and there is efficient power transfer. This approach generally works well when materials have similar refractive indices as is the case with silicon and InP. In cases where there is larger difference in effective indices, such as between e.g. SiN and GaAs or InP, the requirements on taper tip dimensions become prohibitive limiting efficient power transfer. Specifically, extremely small taper tip widths (of the order of tens of nanometers) may be necessary to provide good coupling. Achieving such dimensions is complex and may be cost prohibitive.

Although InP and silicon-based PICs address many current needs, they have some limitations; among them the fact that the operating wavelength range is limited by material absorption increasing the losses, and the fact that there is a limit on the maximum optical intensities and consequently optical powers that a PIC can handle. To address these limitations, alternate waveguide materials have been considered, such as SiN, $LiNbO_3$, $TiO_2$, $Ta_2O_5$, AlN or others. In general, such dielectric waveguides have higher bandgap energies which provides better high-power handling and transparency at shorter wavelength, but, in general such materials also have lower refractive indices. E.g. SiN with bandgap of ~5 eV has refractive index of ~2, AlN has bandgap of ~6 eV and refractive index of around ~2, and $SiO_2$ with bandgap of ~8.9 eV has refractive index of ~1.44. For comparison, the refractive index of both InP and GaAs is >3. This makes the tapered approach challenging.

The alternative hybrid approach suffers from the drawbacks already mentioned above, namely the need for precise alignment, and correspondingly complex packaging and scaling limitations.

A recent approach to the problems discussed above was presented in U.S. Pat. No. 10,859,764 B2 employing butt-coupling in combination with a mode-converter to allow the heterogenous process to be used without the need for extremely small taper widths even if materials have large refractive index differences. This has opened a possibility to address various additional requirements from the PIC that might not be possible on a native platform (e.g., purely InP)

One such requirement would be e.g., making optical sources on a transparent substrate (typically meaning in the visible wavelength range, though it may extend to ir and uv bands). Quartz would be an example of one such substrate, providing very good transparency in the visible band, and optical sources can be integrated utilizing efficient optical coupling between dissimilar materials (with large refractive index difference). U.S. Pat. No. 10,859,764 B2 discusses this approach. Along similar lines, other types of substrates could be utilized for various reasons including optical, electrical, mechanical and/or other considerations.

Some of the substrates and/or cladding materials utilized to confine the optical mode in the waveguide might have relatively poor thermal conductivity. SiO2, for example, has a thermal conductivity of only 1.2 W/(mK) and quartz has a thermal conductivity of only 2 W/mK. Sapphire has a higher thermal conductivity, of around 32 W/(mK), which is comparable to the thermal conductivity of materials such as GaAs (52 W/(mK)) or InP (68 W/mK)), but is still significantly lower than materials such as silicon (230 W/mK), gold (310 W/mK) and/or copper (386 W/mK)). At the other end of the thermal conductivity range, very high-performance materials such as diamond have thermal conductivities of around 2300 W/mK.

Semiconductor lasers are generally susceptible to self-heating, which negatively impacts not only laser threshold, but output power, wall-plug efficiency (WPE), linewidth and noise among other parameters, so improved heat spreading of heterogeneous semiconductor lasers can significantly improve their performance.

The present invention is directed towards PICs employing semiconductor lasers heterogeneously integrated with improved thermal performance elements. In particular, embodiments described below are concerned with the detailed design of the thermally conductive elements, the optical coupling structure and the waveguide design necessary for creation of high-performance lasers when substrates and claddings with low thermal conductivity are involved.

DETAILED DESCRIPTION

Described herein include embodiments of a platform for realization of photonic integrated circuits using wafer bonding and deposition of dissimilar materials where optical coupling is improved by use of mode conversion and a butt-coupling scheme, and an optical source in the PIC is efficiently thermally coupled to a heat spreading element in the PIC.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

Figure 7:
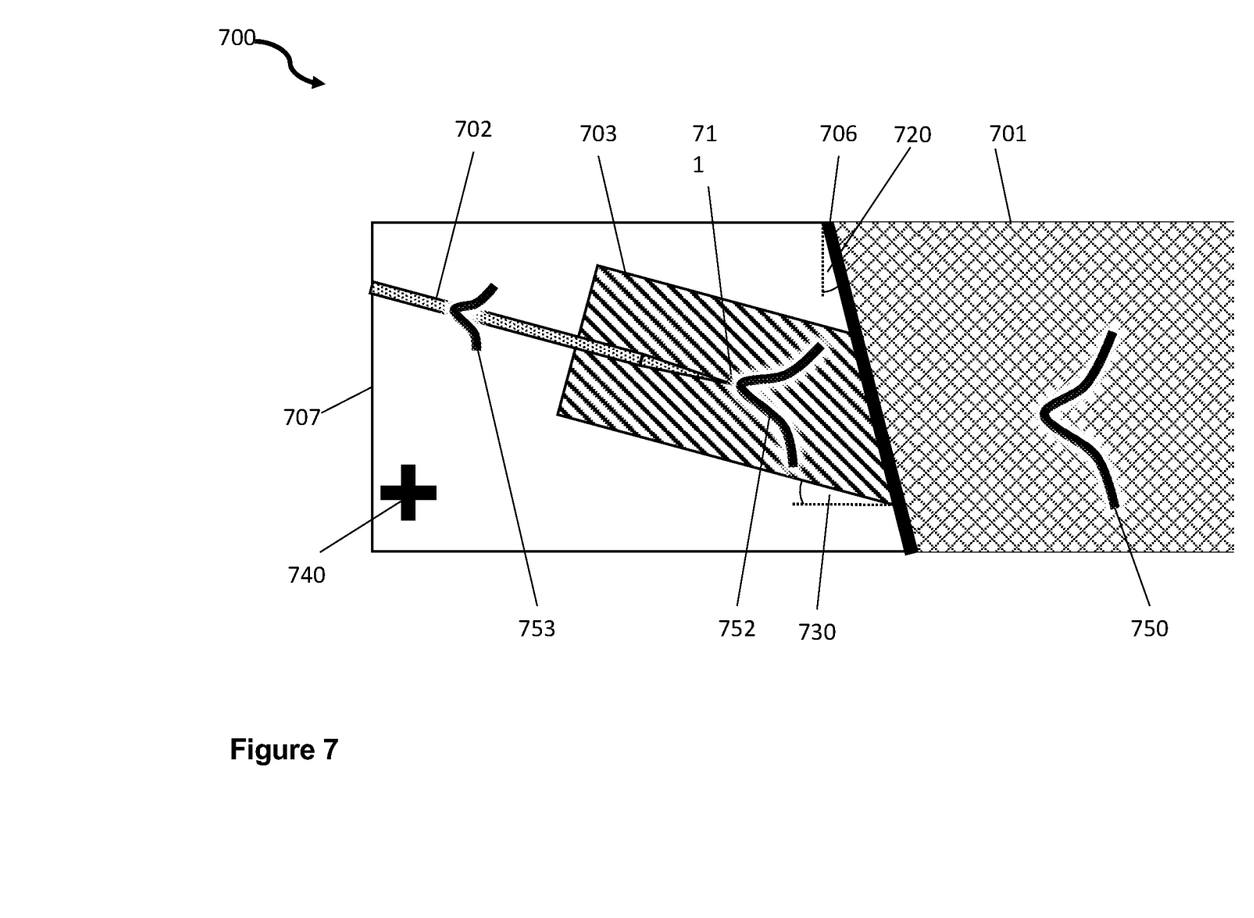
FIG. 7 (Prior Art) shows a cross-sectional top-down view of a device which may, in other cross-sections, include features according to some embodiments of the present invention.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, such as e.g. thin coating layer typically used to provide high-reflectivity or anti-reflectivity functionality. It should be noted that the axes of two waveguide structures or elements need not be colinear for them to be accurately described as being butt-coupled. In other words, the interface between the elements need not be perpendicular to either axis. FIG. 7 embodiments discussed below are exemplary of such possibilities.

The term "thermally coupled" along with its derivates, maybe be used herein. "Thermally coupled" means that there is a thermal path between two or more elements using materials that have higher thermal conductivity than materials that surround them on at least some other surfaces. Example would be a metal via connecting two elements separated by a dielectric material characterized with lower thermal conductivity than the metal via. In some cases, there could still be thin layers of material with lower thermal conductivity remaining between the two or more elements that are "thermally coupled", but the total thermal impedance between "thermally coupled" elements is still significantly reduced compared to the case where "thermal coupling" is absent.

Term "active device", "active structure" or otherwise "active" element, part, component may be used herein. A device or a part of a device called active is capable of light generation, amplification, modulation and/or detection. This is in contrast to what we mean by a "passive device" whose principal function is to confine and guide light, and/or provide splitting, combining, filtering and/or other functionalities that are commonly associated with passive devices. Some passive devices can provide functions overlapping with active device functionality, such as e.g. phase tuning implemented using thermal effects or similar that can provide modulation. No absolute distinction should be assumed between "active" and "passive" based purely on material composition or device structure. A silicon device, for example, may be considered active under certain conditions of modulation, or detection of low wavelength radiation, but passive in most other situations.

Figure 1:
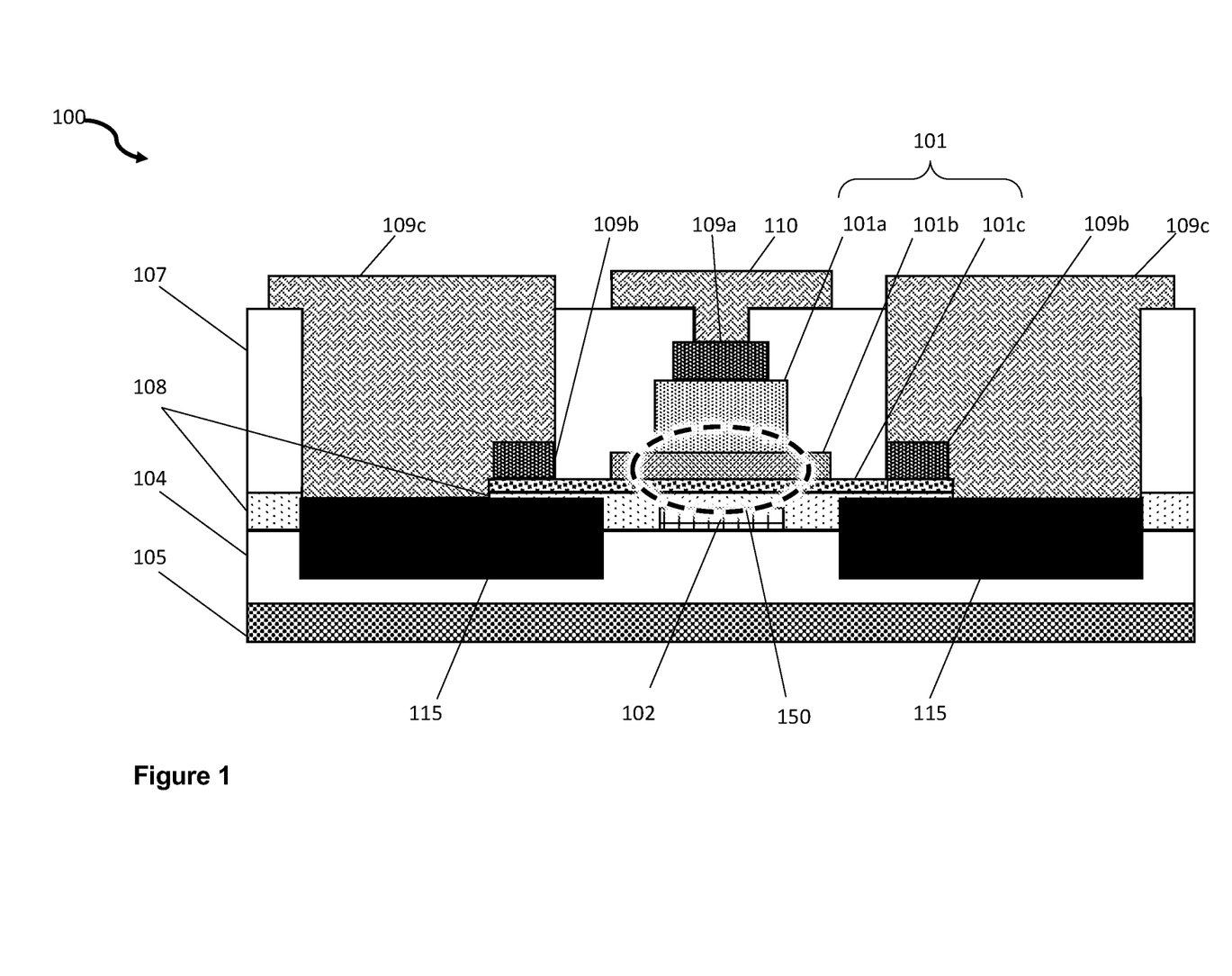
FIG. 1 illustrates a device according to one embodiment of the present invention, shown in end-on cross-section.

FIG. 1 is a schematic end-on cross-section view of an integrated photonic device 100 utilizing heterogeneous integration and thermal optimizations. An exemplary fabrication flows for realizing devices as illustrated in view 100 will be described in detail with the help of FIGS. 2-5.

Substrate 105 can be any suitable substrate for semiconductor and dielectric processing, such as Si, InP, GaAs, quartz, sapphire, glass, borosilicate, calcium fluoride, magnesium fluoride, fused silica, alkaline free glass, GaN, silicon-on-insulator or other materials known in the art. In the shown embodiment, a layer of second material 104 provides optical cladding for material 102 (to be described below), if necessary to form an optical waveguide. Optical waveguides are commonly realized by placing a higher refractive index core between two lower refractive index layers to confine the optical wave. In some embodiments, layer 104 is omitted and substrate 105 itself serves as a cladding. Layer 102 is the waveguide layer (as will be described in detail with the help of FIGS. 6 and 7) on top of layer 104 if present, and/or on top of substrate 105 if layer 104 is not present. The refractive index of layer 102 is higher than the refractive index of layer 104 if present, or, if layer 104 is not present, the refractive index of layer 102 is higher than the refractive index of substrate 105. In one embodiment, the material of layer 102 may include, but is not limited to, one or more of SiN, $SiNO_x$, $TiO_2$, $Ta_2O_5$, (doped) $SiO_2$, $LiNbO_3$ and AlN. In some embodiments, other common dielectric materials may be used for layer 102. In other embodiments, a semiconductor material may be used for layer 102. In some embodiments, the refractive index of layer 102 is between 1.44 and 2.5. Layer 102 is patterned to provide waveguides and other components as described with the help of FIGS. 2-4. Layer 102 is the core for the passive waveguide structure of what is termed the first element in the claims of this disclosure.

Layer 108, whose refractive index is lower than the refractive index of layer 102, overlies layer 102 and underlies layer 101, provides a planarized top surface to which layer 101 (described below) is bonded. The planarization may be controlled to leave a layer of desired, typically very low, thickness on top of the layer 102 (as shown in FIGS. 1-6), or to remove all material above the level of the top surface of the layer 102 (not shown). In the case where a thin layer of 108 is left on top of layer 102, the target thicknesses are in the range of 10 nm to several hundreds of nm, with some tolerance to include the typical across wafer non-uniformity of the planarization process. In some embodiments, a spin-on material is deposited, providing a planar surface, and is then etched back, resulting in improved across wafer uniformity compared to typical CMP processes.

Layer 101 is bonded on top of the planarized top surface of 108 or, if the whole thickness of 108 on top of layer 102 has been removed, the planarized top surface comprising both layers 102 and 108. Said bonding can be direct molecular bonding or can use additional materials to facilitate bonding such as e.g. metal layers or polymer films as is known in the art. Layer 101 comprises what is commonly called an active region, and may be made up of materials including, but not limited to, InP and InP-based ternary and quaternary materials, GaAs and GaAs based ternary and quaternary materials, GaN, GaP, InAs and InSb and their variations and derivatives. or any other suitable material for providing direct optical emission. Layer 101 in some embodiment is multilayered, comprising sublayers providing both optical and electrical confinement as well as electrical contacts, as is known in the art for active devices and shown with sublayers 101a, 101b and 101c. Processing layer 101 can comprise one or more etches to define structures as described below. Layer 101 comprises the core of the active waveguide structure of what is termed the third element in the claims of this disclosure.

Sublayer 101a in some embodiments comprises at least one of the contact layers (either p-contact or n-contact) and optionally a corresponding cladding layer (p-cladding or n-cladding) with the optical mode being laterally confined by etch defining a mesa or ridge. The corresponding metal 109a (either p-metal or n-metal) is deposited on top of sublayer 101a with optional cladding layer and parts of sub-layer 101b serving to reduce internal loss by controlling the overlap between the guided optical mode, indicated by dashed outline 150, and metal 109a and contact layers of sublayer 101a. Metal 109a can comprise multiple materials and/or sublayers as is known in the art of realizing semiconductor contacts. Sublayer 101a can comprise additional layers such as bandgap smoothing layers, etch stop layers, graded layers, electron blocking layers, etc. to provide improved performance or facilitate more robust fabrication as is known in the art of semiconductor device design and fabrication.

Sublayer 101b comprises the active region of the active device. In some embodiments the active region comprises quantum well, quantum dot, pn junction and/or pin junction layers with optional separate confinement heterostructure (SCH) layers. Sublayer 101b can comprise additional layers such as second cladding layers, bandgap smoothing layers, etch-stop layers, graded layers, etc. to provide improved performance and facilitate more robust fabrication as is known in the art of semiconductor device design and fabrication. The width of sublayer 101b, in the left-to-right horizontal direction shown in view 100, is greater than the width of sublayer 101a. In other embodiments (not shown), the width of sublayer 101b is substantially equal to the width of sublayer 101a, accounting for process related limitations (sidewall angle, subsequent lithography step alignment precision, different etch rates for different material compositions, etc.). In some embodiments, both widths of sublayers 101a and 101b are defined with a single etch. In other embodiments, a separate etch (or multiple etches) is done for definition of each width.

Sublayer 101c comprises a second contact layer (opposite polarity to that of sub-layer 101a) and optional superlattice layers to facilitate bonding and/or prevent dislocations. Sublayer 101c can also include additional layers such as cladding layers, bandgap smoothing layers, etch-stop layers, graded layers, etc. to provide improved performance and facilitate more robust fabrication as is known in the art of semiconductor device design and fabrication. The width of sublayer 101c, in the horizontal direction shown in cross-section 100, is greater than the width of sublayer 101a and greater than the width of sublayer 101b. Metal 109b is positioned outside the lateral extent of the optical mode 150 (whose lateral confinement is defined by at least one etch) keeping optical loss due to the contact metal very low or negligible, regardless of the thickness of the respective cladding layers. This is in contrast to case of metal 109a where cladding thickness directly impacts the overlap between the mode 150 and metal 109a. Metal 109b can include multiple materials and/or sublayers as is known in the art of realizing semiconductor contacts.

Layer 115 is a material with a thermal conductivity that is higher than that of at least one of layer 104, layer 107, layer 108 and layer 105. Layer 115 is thermally coupled to layer 101 and serves to facilitate more efficient heat transfer from the active region realized in layer 101, effectively acting as a heat spreader. In some embodiments, layer 115 comprises silicon, amorphous silicon, and/or metal. In other embodiments, layer 115 comprises a compound semiconductor material such as GaAs, InP or similar. In yet other embodiments, layer 115 comprises diamond. The placement of layer 115 relative to optical mode 150 can also serve to facilitate optical mode control by, for example, controlling the modal gain (e.g., fundamental and higher order modes might see different losses). It may additionally or alternatively provide frequency selective feedback, if layer 115 is patterned along a longitudinal axis perpendicular to the cross-section 100 (not shown).

Layer 115 comprises what is termed the second element in the claims of this disclosure.

Layer 115 can provide additional functionalities, depending on the choice of the material from which it is comprised. It may, for example, act as a routing layer for electrical connections; it may include heater elements by which elements like resonators may be tuned to adjust phase or laser wavelength; it may act as the bottom plate of a parallel plate capacitor realized with another conductor or semiconductor; it may control stray light by attenuating light that reaches it due to scattering in the waveguides and other components; and it may provide a mirror or partial-mirror structure to improve the directionality imposed by structures such as surface gratings.

The upper cladding layer 107 can be ambient air (meaning no cladding material is actually deposited) or can be any deliberately deposited suitable material, as shown in FIG. 1, including, but not limited to, a polymer, SiO2, SiNx, SiNOx etc. In some embodiments, the same material is used for layer 107 and layer 108. In some embodiments (not shown), layer 107 cladding functionality can be provided with multiple depositions, e.g. one material provides the surface passivation of 101 and another material provides the cladding for mode 150. In all cases, the refractive index of the cladding material is lower than the refractive index of the material which provides the waveguide core for mode guiding.

Layer 109c is a metal deposited to provide electrical conductivity from top electrical pads (not shown) to contact metals 109a and 109b, and also provide thermal coupling from the active region 101b to layer 115 to facilitate more efficient cooling of the active region. Layer 109c can comprise multiple materials, and/or multiple sub-layers and can be deposited in multiple steps as is known in the art of realizing semiconductor vias and contacts. In some embodiments (not shown) different materials are used for electrical contacts between pads to contact metals, and to facilitate thermal coupling between the active region and layer 115.

Fundamental mode 150 largely resides inside layer 101 due to its refractive index being higher than surrounding materials. In some embodiments, tails of the mode 150 (evanescent field) extend such that small parts might interact with at least one of layer 102 and layer 115.

Figure 2:
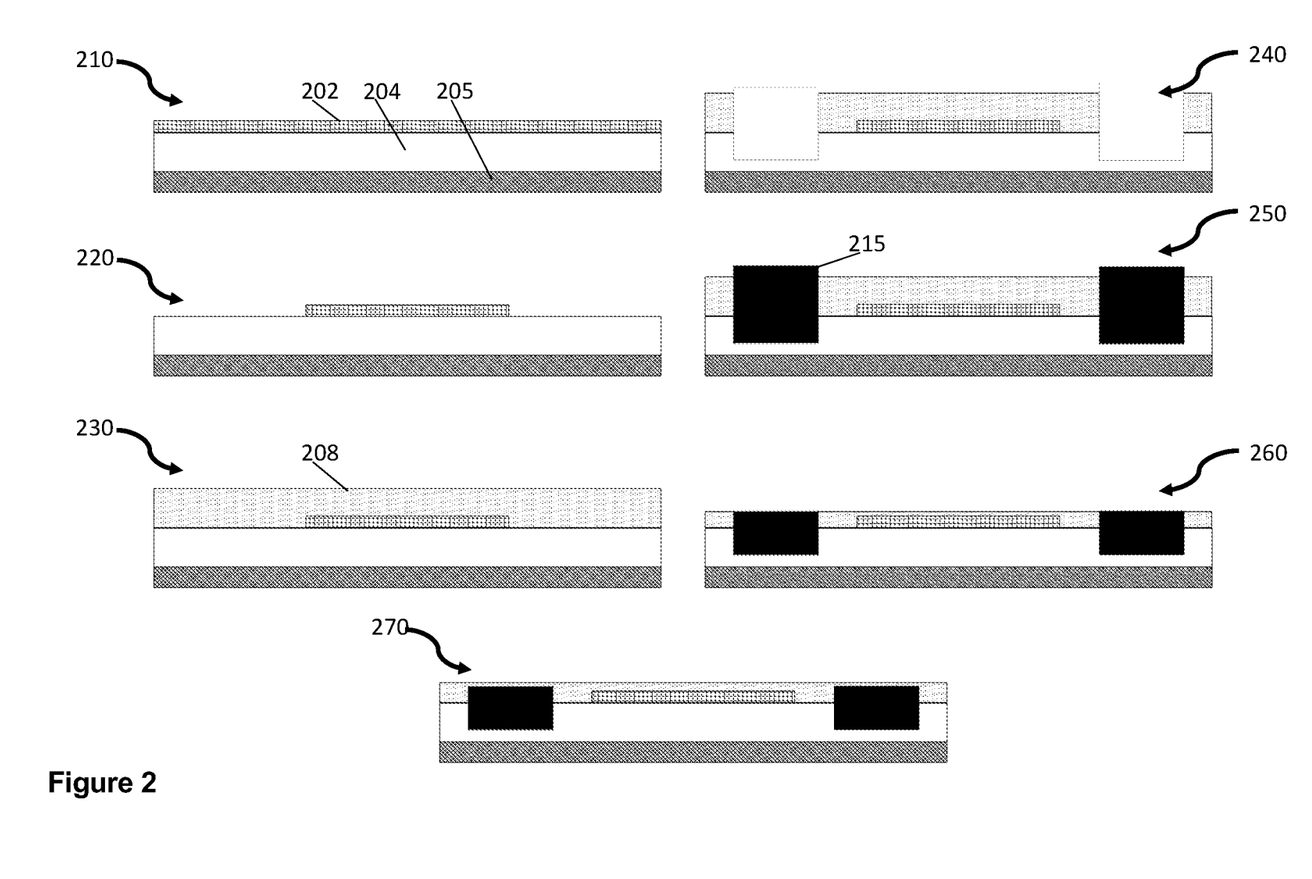
FIG. 2 shows multiple end-on cross-sectional views illustrating exemplary fabrication process flow of device according to some embodiments of the present invention.

FIG. 2 is a process flow illustration of a method according to some embodiments of the present invention, showing cross-sectional views of a device being made according to that method, during some of the operational stages prior to bonding the active material (which will be described with the help of FIG. 5), to make integrated devices of the types described above. Functional layers 202, 204, 205, 208 and 215 (unless explicitly defined differently) correspond to functional layers 102, 104, 105, 108 and 115 as described in relation to FIG. 1.

Processes for making the devices need not always include all the functions, operations, or actions shown and described with respect to FIG. 2, or to include them in exactly the sequence illustrated by the sequence from blocks 210 through 270.

In an exemplary case, however, a method begins as shown in view 210, in which a substrate 205 has been suitably prepared for subsequent processing steps, including the deposition of cladding layer 204, which has also been prepared prior to deposition, growth, transfer, bonding or otherwise attaching layer 202 to the top of layer 204. As previously noted, in some cases, not shown, cladding layer 204 may not be present, in which case layer 202 is attached to the top of layer 205.

The method may then proceed as shown in view 220, where waveguides have been defined by patterning layer 202, in one or more steps. Optionally, other structures, such as, but not limited to, couplers, filters, resonators, etc. may be defined similarly.

From block 220, the method may then proceed as shown in view 230, where planarization material 208 has been deposited, after which, as shown in view 240, that planarization material 208 and, optionally, layer 204 and/or 205 are patterned to open trenches in which layer 215 may be deposited, as shown in view 250, prior to performing planarization to achieve the result shown in view 260. Optionally, as shown in view 270, an additional thin layer of material, 208, can be deposited to encapsulate layer 215 before proceeding with bonding and additional processing. as will be described below with reference to FIG. 5.

Figure 3:
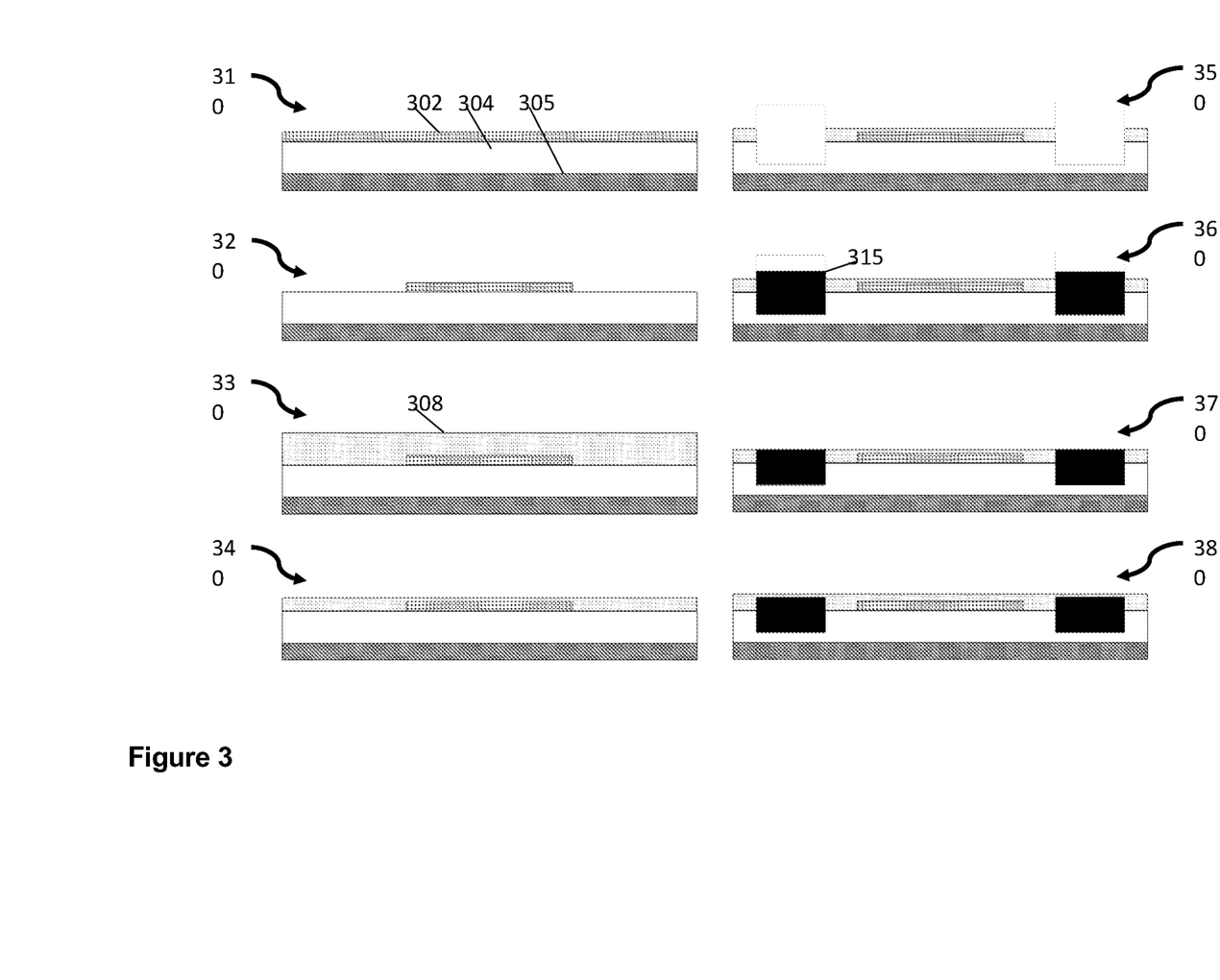
FIG. 3 shows multiple end-on cross-sectional views illustrating exemplary fabrication process flow of device according to some embodiments of the present invention.

FIG. 3 is a process flow illustration of a method according to some embodiments of the present invention, showing cross-sectional views of an integrated device being made according to that method, during some of the operational stages prior to the steps involved in attaching the active material. The latter steps will be described below with reference to FIG. 5. Functional layers 302, 304, 305, 308 and 315 (unless explicitly defined differently) correspond to functional layers 102, 104, 105, 108 and 115 as described in relation to FIG. 1.

Processes for making the devices need not always include all the functions, operations, or actions shown and described with respect to FIG. 3, or to include them in exactly the sequence illustrated by the sequence from blocks 310 through 380.

In an exemplary case, however, a method begins as shown in view 310, in which a substrate 305 has been suitably prepared for subsequent processing steps, including the deposition of cladding layer 304, which has also been prepared prior to deposition, growth, transfer, bonding or otherwise attaching layer 302 to the top of layer 304. As previously noted, in some cases, not shown, cladding layer 304 may not be present, in which case layer 302 is attached to the top of layer 305.

The method may then proceed as shown in view 320, where waveguides have been defined by patterning layer 302, in one or more steps. Optionally, other structures, such as, but not limited to, couplers, filters, resonators, etc. may be defined similarly.

From block 320, the method may then proceed as shown in view 330, where planarization material 308 has been deposited, after which as shown in view 340, that planarization material 308 has been planarized by chemical mechanical polishing (CMP) or other etching, chemical and/or mechanical polishing methods. In other embodiments, the planarity is provided because of the intrinsic nature of the method by which layer 308 is deposited, for example if the material of layer 308 is a spin-on glass, polymer, photoresist or other suitable material. In such cases additional planarization is not essential but may be performed as an option. The planarization may be controlled to leave a layer of desired thickness, typically very low, on top of the layer 302 (as shown in FIG. 3), or to remove all material above the level of the top surface of the layer 302 (not shown).

That planarization material 308 and, optionally, layer 304 and/or 305 are then patterned as shown in view 350, to open trenches in which layer 315 may be deposited, as shown in view 360, prior to performing planarization to achieve the result shown in view 370. Optionally, as shown in view 380, an additional thin layer of material 308, can be deposited to encapsulate layer 315 before proceeding with bonding and additional processing. as will be described below with reference to FIG. 5.

Figure 4:
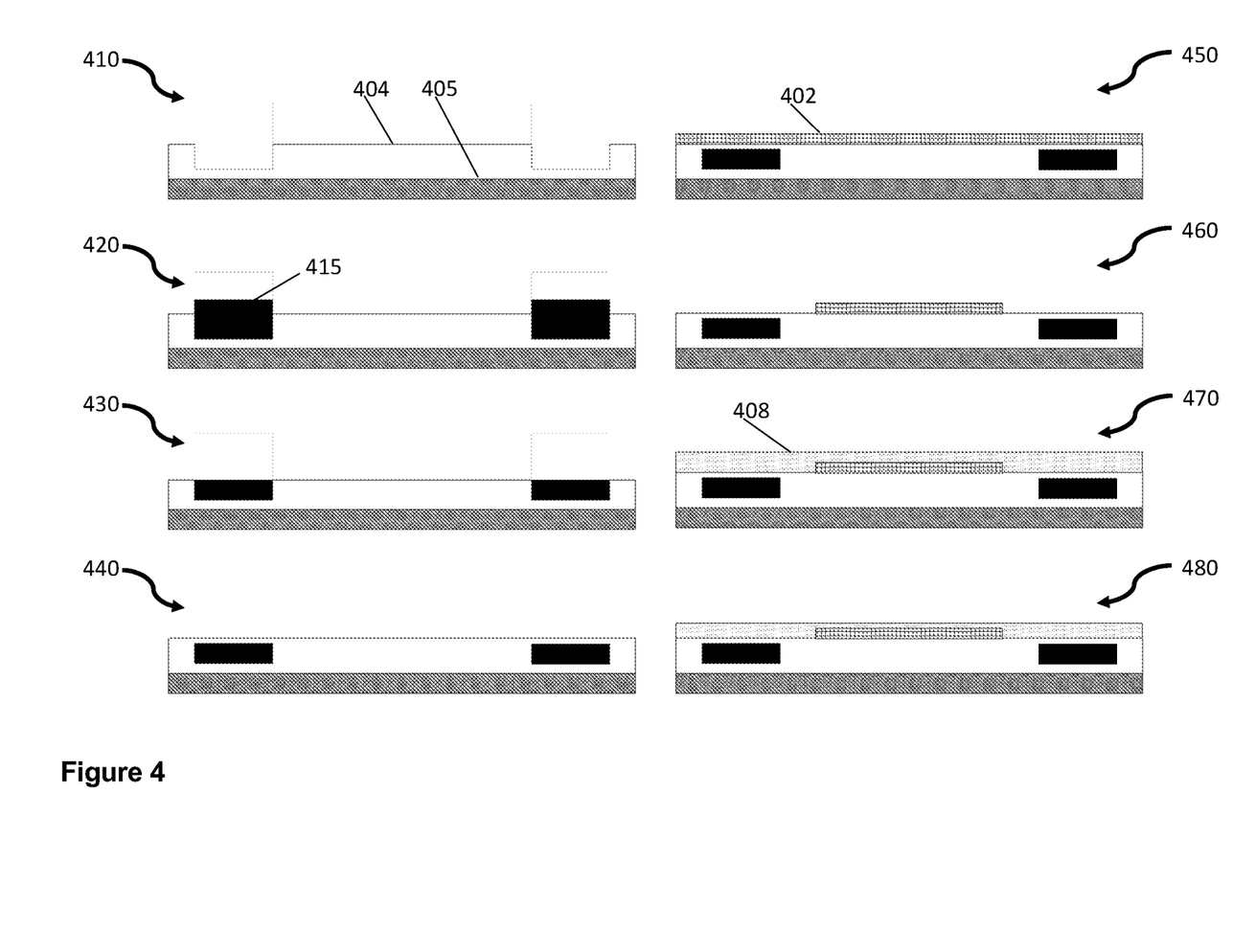
FIG. 4 shows multiple end-on cross-sectional views illustrating exemplary fabrication process flow of device according to some embodiments of the present invention.

FIG. 4 is a process flow illustration of a method according to some embodiments of the present invention, showing cross-sectional views of an integrated device being made according to that method, during some of the operational stages prior to the steps involved in attaching the active material. The latter steps will be described below with reference to FIG. 5. Functional layers 402, 404, 405, 408 and 415 (unless explicitly defined differently) correspond to functional layers 102, 104, 105, 108 and 115 as described in relation to FIG. 1.

Processes for making the devices need not always include all the functions, operations, or actions shown and described with respect to FIG. 4, or to include them in exactly the sequence illustrated by the sequence from blocks 410 through 480.

In an exemplary case, however, a method begins as shown in view 410, in which a substrate 405 has been suitably prepared for subsequent processing steps, including the deposition of cladding layer 404, which has also been prepared and patterned in preparation to open trenches. In some cases, not shown, cladding layer 404 may not be present. View 420 shows a cross-section through the device after layer 415 has been deposited in those trenches, prior to a planarization step. View 430 shows the device after planarization is carried out. View 440 shows the effect of an optional step, involving the deposition of an additional thin layer of material 404, to encapsulate layer 415.

View 450 shows the device cross-section after a layer 402 is deposited, grown, transferred, bonded or otherwise attached to the top of layer 404 (or, if not present, 405). The method may then proceed as suggested by view 460, to pattern layer 402 in one or more steps to define waveguides, and optionally other structures, such as, but not limited to, couplers, filters, resonators, etc.

The method may then proceed to deposit planarization material 408, as shown in view 470, after which that planarization material 408 may be planarized by chemical mechanical polishing (CMP) or other etching, chemical and/or mechanical polishing methods, to achieve the result shown in view 480. In other embodiments, the planarity is provided because of the intrinsic nature of the method by which layer 408 is deposited, for example if the material of layer 408 is a spin-on glass, polymer, photoresist or other suitable material. In such cases additional planarization is optional. The planarization may be controlled to leave a layer of desired, typically very low, thickness on top of the layer 402 (as shown in FIG. 4), or to remove all material above the level of the top surface of the layer 402 (not shown).

Bonding and additional processing may then be carried out, as described below with reference to FIG. 5.

FIGS. 2-4 illustrate just some embodiments of processes that can be used to prepare the substrate with layers 215/315/415 that are "pre-processed" for subsequent bonding to be carried out, as will be described with reference to FIG. 5. It is understood that many variations of such process can be envisioned without departing from the spirit of invention. Similarly, layers 215/315/415 can be in contact with substrate 205/305/405 (not shown) without intervening cladding 204/304/404.

Figure 5:
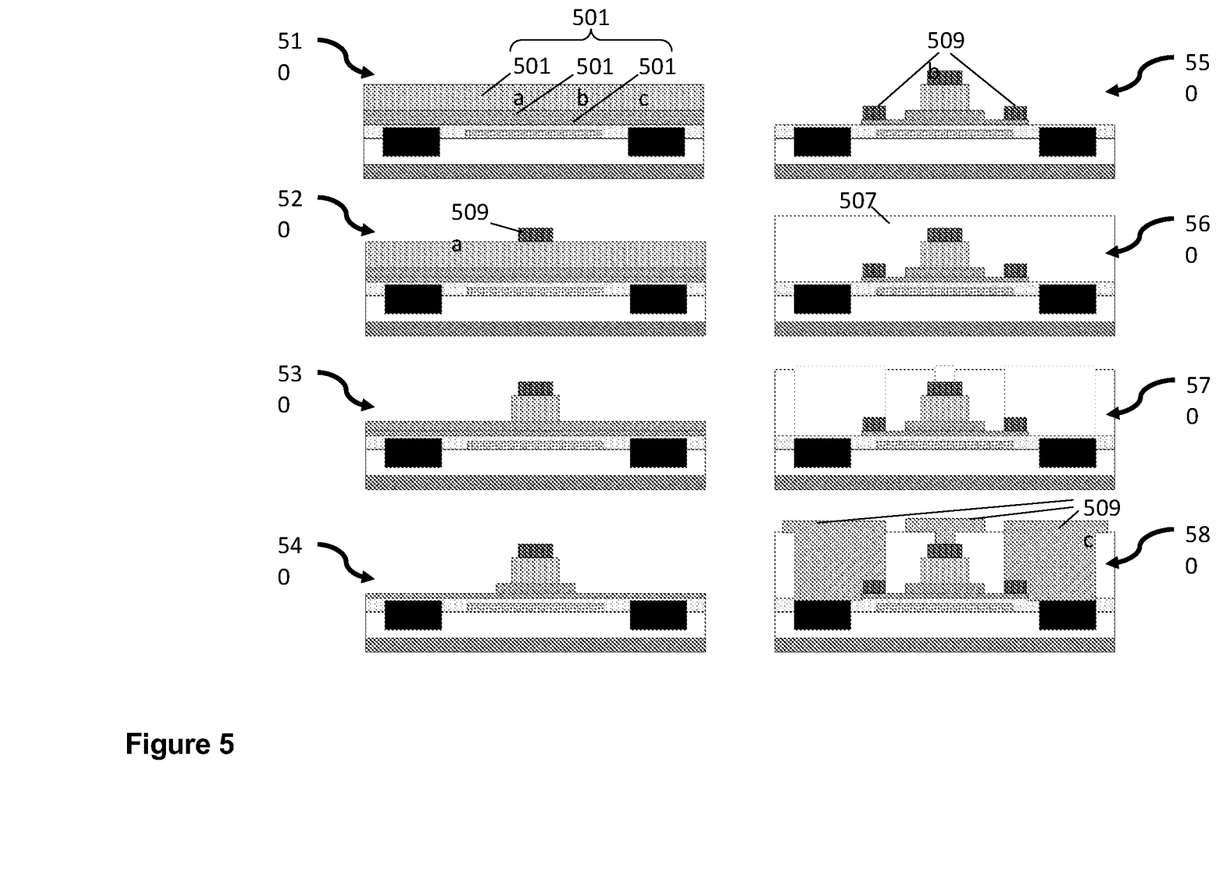
FIG. 5 shows multiple end-on cross-sectional views illustrating exemplary fabrication process flow of device according to some embodiments of the present invention.

FIG. 5 is a process flow illustration of a method according to some embodiments of the present invention, showing cross-sectional views of a device being made according to that method, during some of the operational involved in processing bonded active material to provide high-performance heterogeneously integrated devices.

Functional layers 501a, 501b, 501c, 501, 507, 509a, 509b, and 509c (unless explicitly defined differently) correspond to functional layers 101a, 101b, 101c, 101, 107, 109a, 109b, and 109c as described in relation to FIG. 1.

Processes for making the devices need not always include all the functions, operations, or actions shown and described with FIG. 5, or to include them in exactly the sequence illustrated by the sequence from blocks 510 through 580.

View 510 shows a device cross-section where pieces or whole wafers of material comprising layer 501 and sublayers 501a, 501b and 501c have been bonded onto wafers that were pre-processed as described with reference to one of FIGS. 2-4, and part of the substrate from those pieces or whole wafers comprising layer 501 has been removed as is known in the art. The remaining thickness of bonded layer 501, in some embodiments, is thinner than 10 µm.

The process continues with the deposition of layer 509a as shown in view 520, before a first etch defines a mesa in layer 501a, as shown in view 530, and a second etch defines the active region in layer 501b and opens access to layer 501c, as shown in view 540. As described above, similar functionality can be realized utilizing only one etch, or more than two etches depending on specific layer and device designs. After the stage illustrated in view 540, the method proceeds to deposit layer 509b and remove non-functional parts of layer 501c to open access to layers underlying 501c prior to the partial removal, as shown in view 550. The method continues with cladding 507 deposition as shown in view 560, before opening vias as shown in view 570 and finally depositing material 509c as shown in view 580. Material 509c serves to enhance thermal coupling between active region defined in layer 501 and the heat spreader defined in layers 215/315/415 as described in relation to FIGS. 2-4.

Figure 6:
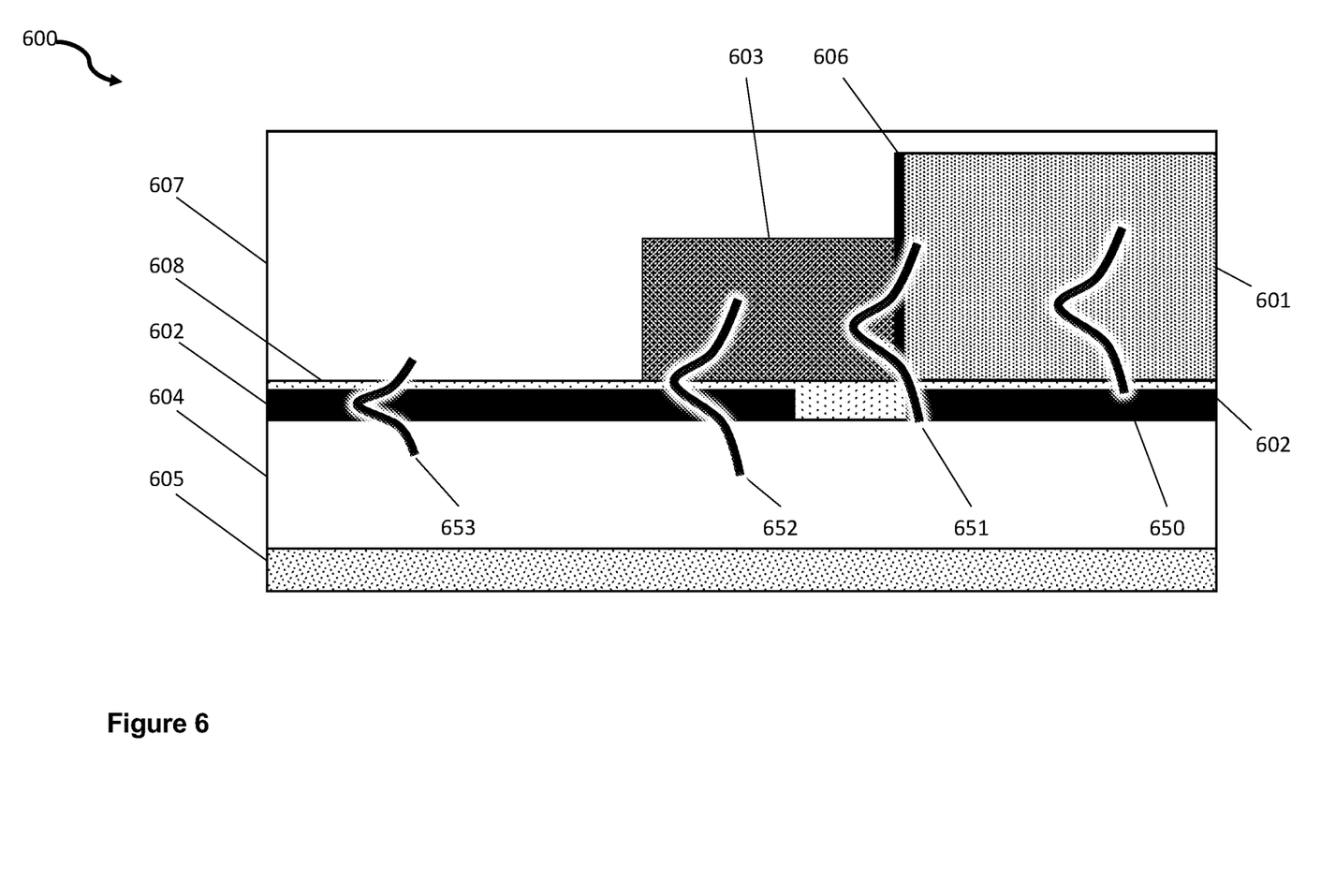
FIG. 6 (Prior Art) shows a cross-sectional view of a device which may, in other cross-sections, include features according to some embodiments of the present invention.

Layer 603/703, not visible in this cross-section, but to be described with reference to FIGS. 6 and 7, is realized at the stage illustrated in view 560, may be created as a result of multiple depositions and etches.

Further processing of the various dielectric and/or semiconductor layers, and/or electrical contacts, and the addition and processing of index matching layers, additional upper cladding, multiple vias, bonding pads, etc. may be performed as is known in the art.

FIG. 6 is a schematic cross-section view of an integrated photonic device 600 utilizing butt-coupling and mode conversion for efficient coupling between dissimilar materials. Functional layers 601, 602, 604, 605, 607 and 608 (unless explicitly defined differently) correspond to functional layers 101, 102, 104, 105, 107 and 108 as described in relation to FIG. 1.

The exemplary cross-section includes a substrate 605, optional cladding 604, and waveguide material 602. Optional planarization layer 608, with a refractive index that is lower than the refractive index of layer 602, overlies layer 602 and underlies layers 601 and 603 (to be described in more detail below) and serves to planarize the patterned surface of layer 602. The planarization may be controlled to leave a layer of desired thickness, typically very low, on top of layer 602 (as shown in FIG. 6), or to remove all material above the level of the top surface of layer 602 (not shown).

Layer 601 is bonded on top of the whole or part of the corresponding (608, 602) top surface. Layer 601 in some embodiments is multilayered, comprising sublayers providing both optical and electrical confinement as well as electrical contacts, as is known in the art for active devices (not shown in FIG. 1 but explained with reference to FIGS. 1 and 5). Efficient coupling between optical mode 650 and optical mode 653 is facilitated by layer 603, and, in cases where layer 606 is present, by layer 606. Optional layer 606 primarily serves as either an anti-reflective or a highly reflective coating at the interface between layer 601 and layer 603. Layer 603 serves as an intermediate waveguide that in some embodiments accepts the profile (depicted by line 650) of an optical mode supported by the waveguide for which layer 601 provides the core, captures it efficiently as mode profile 651, and gradually transfers it to mode profiles 652, and finally 653. Mode profile 653 is efficiency coupled to the waveguide for which layer 602 provides the core.

The refractive index of layer 603 can be engineered to facilitate efficient coupling of mode profile 650 and to efficiently transform the mode to one with mode profile 653 by taking advantage of tapered structures made in layer 602 and/or 603. In some embodiments the refractive index of layer 603 is between 1.5 and 2. In the absence of intermediate layer 603, the requirements on taper tip width would be, as discussed below, problematic. The use of intermediate layer 603, however, significantly reduces the stringent requirements on taper tip width, allowing efficient transfer between high refractive index materials in layer 601 to low refractive index materials in layer 602. Layer 603 is the core of the intermediate waveguide structure of what is termed the fourth element in the claims of this disclosure.

Differences between the optical modes supported by waveguides in layers 601 and 602 respectively may or may not be obvious by observation of the mode profiles, but mode overlaps less than 100% and vertical offset (in FIG. 6) in between modes 650 and 653 could (in the absence of intermediate layer 603) result in significant optical loss. In some cases, it may be considered that losses of up to 1 dB are acceptable, but losses greater than that are not. In other cases, a 3 dB loss level may be the criterion chosen. The function of layer 603 is to keep optical loss due to imperfect mode overlap below whatever is determined to be an acceptable level in a given application.

Layer 607 serves as upper cladding for waveguides realized in 603 and/or 602. In some embodiments (not shown), layer 607 cladding functionality can be provided with multiple depositions, e.g. one material provides the cladding for mode 653 guided by core formed in layer 602, and another material provides the cladding for mode 651 guided by core formed in layer 603. In all cases, the refractive index of cladding material is lower than the refractive index of the material which provides the core for the mode guiding. In yet another embodiment (not shown), layer 603 can provide cladding functionality to layer 602 and mode 653, owing to its refractive index being lower by design.

In some embodiments (not shown), layer 602 may be patterned to provide frequency selective feedback to the mode 650 through interaction between the evanescent field of the mode 650 and the patterned structure in layer 602. This can be used to provide e.g., distributed feedback (DFB) lasers.

One or more lithography alignment marks (not shown in this cross-sectional view, but see, for example, 740 in FIG. 7 and described below) are present to facilitate precise alignment between the layers formed during various processing steps.

FIG. 7 depicts a top-down view of an integrated photonic device 700 according to one embodiment of the present invention zoomed into the transition area, where boundaries between dissimilar materials are angled to control both the transmission and back reflection. Functional layers 701 to 707 (unless explicitly defined differently) correspond to functional layers 601 to 607 as described in relation to FIG. 6.

The optical mode 750 supported by active layer 701 (defined by at least one lateral etch, not shown but described with the help of FIGS. 1 and 5) is guided through optional coating layer 706 to layer 703 that supports optical mode 752 and serves to convert the optical mode for efficient coupling to layer 702 which supports optical mode 753. Layer 706 can provide high reflection functionality or can facilitate reduced reflection when designed to function as anti-reflection coating. To facilitate coupling between modes supported by layers 701 and 702, the dimensions of layer 702 are tapered down towards layer 701, as indicated by the relatively small width of the tip 711 relative to the width of layer 702 shown at the extreme left of the figure. It has been calculated that the requirements on taper dimensions are significantly relaxed up to several hundred nanometers due to the presence of layer 703. For example, a coupling efficiency between 701 and 702 of or greater than 70% may be achieved, even if the refractive index difference between 701 and 702 is larger than one, for a tip width greater than hundred nanometers. In contrast, in the absence of layer 703, layer 701 would have to be tapered such that its mode may directly couple into layer 702, the dimensions of taper tip of layer 701 (not shown) would have to be much less than one hundred nanometers for a similar coupling efficiency. In another embodiment, a taper is created in layer 703 instead of in layer 702 (not shown). In yet another embodiment, tapers may be created in both layers 702 and 703 for highly efficient coupling. In some embodiments, said tapers in layers 702 and 703 can be multistage tapers meaning they utilize more than one etch depth to facilitate more efficient coupling.

Additionally, in this embodiment, one or more of the interfaces between layers 701, 706 and/or 703 are angled to reduce corresponding back reflection(s).

The angle 720 defines the angle between the tangent of the direction of propagation of the wave inside structure 701 and the facet (interface toward 706 and/or 703 if layer 706 is not present). Angle 720 is primarily selected to control the back reflection of the mode supported by layer 701 when it reaches the interface toward 706 and/or 703 and precise angle is a result of numerical or experimental optimization. In some embodiments it ranges from 0° to 80°.

The angle 730 defines the angle between the direction of the propagation of the wave inside the structure 701 and the angle of the waveguide formed by 703. Said angle is an optimization parameter for coupling efficiency between the modes supported by layer 701 and 703 and is related to the choice of the angle 720 and/or the refractive indices of used materials in layers 701 and 703 and their respective claddings. In some embodiments it ranges from 0° to 80°.

Precise vertical alignment (up/down in FIG. 7) between the axis defined by the center of the waveguide defined in structure 701 and the center of the waveguide 703 at the interface to 706 and/or 701 is an optimization parameter where such offset can be positive (up in FIG. 7), negative (down in FIG. 7) and/or substantially equal to 0 (no offset). Such optimization is straightforward to perform with numerical software to maximize the performance of the transition together with optimizing the angle 730.

In the absence of intermediate layer 603/703, the requirements on taper tip width for direct transfer between layer 601/701 and 602/702 would be problematic. The use of intermediate layer 603/703 that is butt-coupled, albeit with angled interface in some embodiments, to layer 601/701, however, significantly reduces the stringent requirements on taper tip widths, allowing efficient transfer between high refractive index materials in layer 601/701 to low refractive index materials in layer 602/702. Layer 603/607 may comprise a dielectric, a polymer, and/or any other suitable material. No adiabatic transformation occurs between the optical modes supported by elements 601/701 and 603/703 at the butt-coupled interface. Layer 603/703 and/or layer 602/702 can comprise bends (not shown) to control the routing of the guided optical waves. One or more lithography alignment marks 740 are present to facilitate precise alignment between the layers formed during various processing steps.

Figure 8:
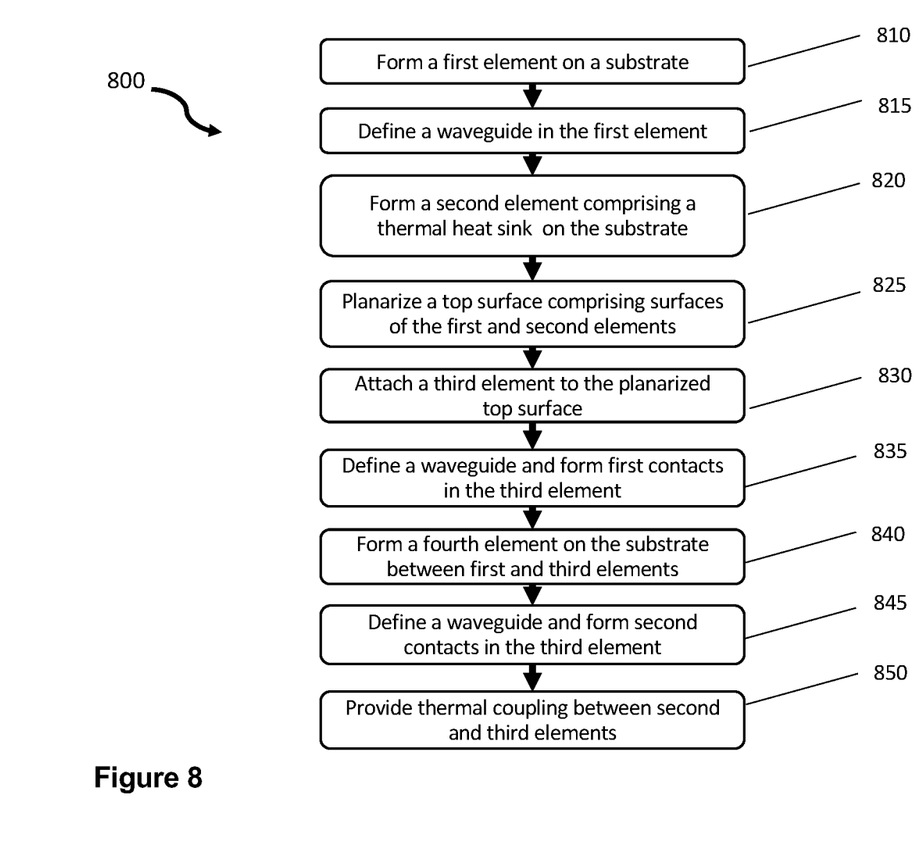
FIG. 8 is a flowchart illustrating steps of a method according to some embodiments of the present invention.

FIG. 8 is a flowchart of process steps of one method 800 according to the present invention, roughly corresponding to some of the steps involved in embodiments illustrated in FIGS. 2, 3 and 5. At step 810, a first element is formed on a substrate. At step 815, a waveguide is defined in that first element. At step 820, a second element, comprising a heat sink, is formed on the substrate. At step 825, a top surface comprising surfaces of the first and second elements is planarized. At step 830, a third element is attached to the planarized top surface, and at step 835, a waveguide is defined, and a first set of contacts is formed, in that third element. At step 840, a fourth element is formed on the substrate between the first and third elements, and at step 845, a waveguide is defined, and a second set of contacts is formed, in that fourth element. At step 850, thermal coupling is provided between the second and third elements.

Throughout this specification, including the claims, the terms "first optical mode", "second optical mode" and "intermediate optical modes" should be understood as referring to the modes carried by portions of the device of interest that are referred to as the "first element", the "third element" and the "fourth element" respectively. This may be appreciated most clearly in relation to specific examples illustrated in FIGS. 1 and 7 as follows:

In end-on view FIG. 1, active mode 150 indicated by a dashed outline corresponds to the "second optical mode" supported by the active layer 101 making up the "third element". In the example shown in FIG. 7, active mode 750 corresponds to the "second optical mode" supported by the "third element" 701, mode profile 752 indicates the intermediate mode supported by intermediate "fourth element" 703, and mode profile 753 corresponds to the "first optical mode" supported by passive "first element" layer 702.

Embodiments of the present invention offer many benefits related to high-temperature or high-power operation of lasers by optimizing thermal performance by increasing the thermal conductivity of nearby elements, so reducing the laser active region (or junction) temperature with respect to the substrate temperature.

This present invention utilizes a process flow consisting of typically wafer-bonding of a blanket piece of compound semiconductor material on a suitably prepared, carrier wafer with, in some embodiments, heat spreader elements and dielectric waveguides (as is described with the help of FIGS. 2-5) and subsequent semiconductor fabrication processes as is known in the art. It enables an accurate definition of optical alignment between active waveguides, passive waveguides and heat spreader elements via typically photo lithography steps, removing the need for precise physical alignment. Said photo lithography-based alignment allows for scalable manufacturing using wafer scale techniques.

Efficient optical transfer between dissimilar materials is facilitated by using a butt-coupling approach in combination with a mode-converter (the intermediate waveguide) that removes the need for narrow taper tips that are challenging to resolve and fabricate with current state-of-the-art tools.

Embodiments of the optical devices described herein may be incorporated into various other devices and systems including, but not limited to, various computing and/or consumer electronic devices/appliances, communication systems, sensors and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A device comprising:
   first, second, third and fourth elements fabricated on a common substrate;
   wherein the first element comprises a passive waveguide structure supporting a first optical mode, the second element, thermally coupled to the third element, provides heat spreading functionality, the third element comprises an active waveguide structure supporting a second optical mode, and the fourth element, at least partly butt-coupled to the third element, comprises an intermediate waveguide structure supporting intermediate optical modes;
   wherein a tapered waveguide structure in either one of the first and fourth elements facilitates efficient adiabatic transformation between the first optical mode and one of the intermediate optical modes;
   wherein no adiabatic transformation occurs between any of the intermediate optical modes and the second optical mode; and
   wherein mutual alignments of the first, second, third and fourth elements are defined using lithographic alignment marks that facilitate precise alignment between layers formed during processing steps of fabricating the first, second, third and fourth elements.

2. The device of claim 1,
wherein the third element is attached to a planarized top surface comprising a top surface of the first element.

3. The device of claim 1,
wherein the interface between third and fourth elements is angled at an angle optimized to minimize reflections.

4. The device of claim 1,
wherein the second element comprises silicon.

5. The device of claim 1,
wherein the second element comprises amorphous silicon.

6. The device of claim 1,
wherein the second element comprises a metal.

7. The device of claim 1,
wherein the second element comprises a semiconductor.

8. The device of claim 1,
wherein the second element comprises diamond.

9. The device of claim 1,
wherein the second element is thermally coupled to the third element using at least one of an n-contact metal, p-contact metal, via or pad metal.

10. The device of claim 1,
wherein the substrate is one of quartz, sapphire, glass, borosilicate, calcium fluoride, magnesium fluoride, fused silica or alkaline free glass.

11. The device of claim 1,
wherein the second element is patterned such that at least one of modal gain control and frequency selective feedback for the first optical mode is provided.

12. A method for making a device; the method comprising:
   forming a first element, comprising a dielectric material, on a substrate;
   defining a waveguide, configured to support a first optical mode, in the first element;

forming a second element, comprising a thermal heatsink, on the substrate;

planarizing a top surface comprising a top surface of the first element;

attaching a third element comprising an active material to the planarized top surface;

defining a waveguide configured to support a second optical mode in the third element where its position relative to the first element is defined by lithographic alignment marks;

forming first electrical contacts in the third element; and forming, on the planarized top surface, a fourth element between and in contact with the first and third elements, the position of the fourth element relative to the first and third element being defined by lithographic alignment marks; and defining an intermediate waveguide in the fourth element, the intermediate waveguide element being configured to facilitate transformation between the first and second optical modes; and forming second electrical contacts in the third element and providing thermal coupling between the second and third elements.

13. The method of claim 12, wherein the second element comprises amorphous silicon.

14. The method of claim 12, wherein the second element comprises a metal.

15. The method of claim 12, wherein the first element comprises silicon nitride and third element comprises GaAs.

16. The method of claim 12, wherein the first element comprises silicon nitride and third element comprises InP.

17. The method of claim 12, wherein the first element comprises silicon nitride and third element comprises GaN.

18. The method of claim 12, wherein the first element comprises silicon oxynitride and third element comprises GaN.

19. The method of claim 12, wherein a thin cladding layer separates a top surface of the first element and a bottom surface of the third element.

* * * * *